US011537275B2

(12) United States Patent
Kim et al.

(10) Patent No.: US 11,537,275 B2
(45) Date of Patent: Dec. 27, 2022

(54) REMOTE CONTROL DEVICE, DISPLAY DEVICE, AND REMOTE CONTROL SYSTEM INCLUDING SAME

(71) Applicant: SAMSUNG ELECTRONICS CO., LTD., Suwon-si (KR)

(72) Inventors: Hansoo Kim, Suwon-si (KR); Hyoseung Park, Suwon-si (KR); Soyon You, Suwon-si (KR); Seongwook Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/299,691

(22) PCT Filed: Nov. 26, 2019

(86) PCT No.: PCT/KR2019/016373
§ 371 (c)(1),
(2) Date: Jun. 3, 2021

(87) PCT Pub. No.: WO2020/116845
PCT Pub. Date: Jun. 11, 2020

(65) Prior Publication Data
US 2022/0035498 A1 Feb. 3, 2022

(30) Foreign Application Priority Data
Dec. 6, 2018 (KR) .................. 10-2018-0156187

(51) Int. Cl.
*G06F 3/048* (2013.01)
*G06F 3/0484* (2022.01)
(Continued)

(52) U.S. Cl.
CPC .......... *G06F 3/0484* (2013.01); *G06F 3/0346* (2013.01); *G08C 17/02* (2013.01);
(Continued)

(58) Field of Classification Search
CPC ...... G06F 3/0484; G06F 3/0346; G08C 17/02
See application file for complete search history.

(56) References Cited

U.S. PATENT DOCUMENTS 9,582,990 B2 2/2017 Peng
10,446,020 B2 10/2019 Hur et al.
(Continued)

FOREIGN PATENT DOCUMENTS

JP 2009-10486 A 1/2009
KR 10-0703207 B1 4/2007
(Continued)

OTHER PUBLICATIONS

International Search Report (PCT/ISA/210) dated Apr. 20, 2020, issued by the International Searching Authority in International Application No. PCT/KR2019/016373.
(Continued)

*Primary Examiner* — David E Choi
(74) *Attorney, Agent, or Firm* — Sughrue Mion, PLLC

(57) ABSTRACT

A display system is disclosed. The display system comprises a remote control device and a display device. The remote control device receives identification information about an external device from the external device, recognizes the angle of communication with the external device, and transmits the identification information and information about the angle to the display device. The display device identifies the external device on the basis of the information about the angle, and registers the identified external device as an operable external device when the remote control device is determined to have received the identification information while oriented toward the external device.

14 Claims, 17 Drawing Sheets

(51) Int. Cl.
*G06F 3/0346* (2013.01)
*G08C 17/02* (2006.01)

(52) U.S. Cl.
CPC ..... *G08C 2201/20* (2013.01); *G08C 2201/30* (2013.01); *G08C 2201/50* (2013.01); *G08C 2201/71* (2013.01); *G08C 2201/92* (2013.01)

(56) References Cited

U.S. PATENT DOCUMENTS

| | | | | |
|---|---|---|---|---|
| 2009/0273485 | A1* | 11/2009 | Wike | G08B 21/24 340/686.6 |
| 2011/0080120 | A1* | 4/2011 | Talstra | H05B 47/19 340/9.1 |
| 2014/0136633 | A1* | 5/2014 | Murillo, Jr. | H04L 51/24 709/206 |
| 2015/0222862 | A1 | 8/2015 | Lee | |
| 2015/0365386 | A1* | 12/2015 | Sallas | H04L 67/1068 713/171 |
| 2016/0072638 | A1 | 3/2016 | Amer et al. | |
| 2016/0307439 | A1* | 10/2016 | Selfe | G08C 17/02 |
| 2018/0191821 | A1 | 7/2018 | Sun et al. | |
| 2018/0191841 | A1 | 7/2018 | Tyebkhan et al. | |
| 2020/0126403 | A1* | 4/2020 | Seo | G08C 17/02 |
| 2020/0389701 | A1* | 12/2020 | Hoots | H04N 21/42222 |
| 2022/0035498 | A1* | 2/2022 | Kim | G08C 17/02 |
| 2022/0050582 | A1* | 2/2022 | Zhou | G06F 9/451 |

FOREIGN PATENT DOCUMENTS

| | | |
|---|---|---|
| KR | 10-1233783 B1 | 2/2013 |
| KR | 10-2014-0078992 A | 6/2014 |
| KR | 10-2014-0137080 A | 12/2014 |
| KR | 10-2017-0001434 A | 1/2017 |
| KR | 10-2018-0015844 A | 2/2018 |

OTHER PUBLICATIONS

Written Opinion (PCT/ISA/237) dated Apr. 20, 2020, issued by the International Searching Authority in International Application No. PCT/KR2019/016373.

* cited by examiner

FIG. 9
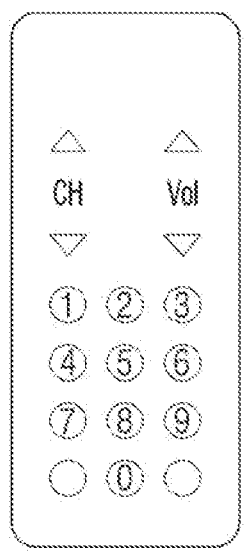
(a)
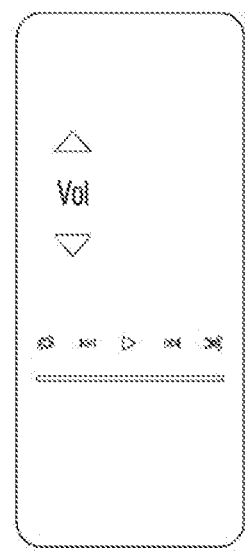
(b)

FIG. 10
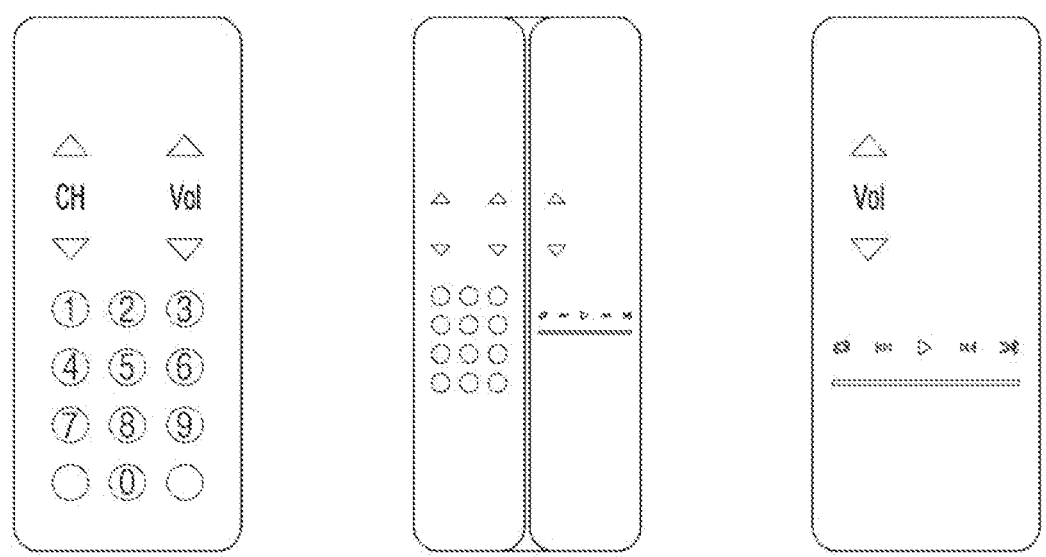
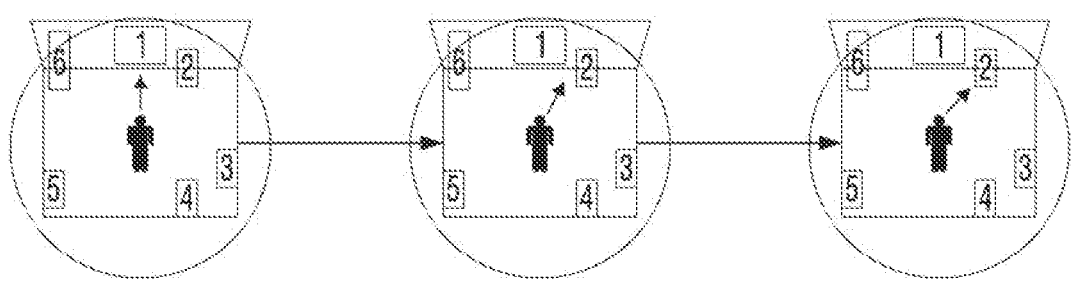
(a)            (b)            (c)

REMOTE CONTROL DEVICE, DISPLAY DEVICE, AND REMOTE CONTROL SYSTEM INCLUDING SAME

TECHNICAL FIELD

This disclosure relates to a remote control device, a display device, and a remote control system including the same and, more particularly, to a remote control device capable of registering and controlling a device to be controlled, a display device, and a remote control system including the same.

BACKGROUND ART

With the development of semiconductor technology and wireless communication technology, a variety of technology development is made. In particular, an Internet of Things (IoT) technology for transmitting and receiving data in real time between things has been developed recently.

Through the IoT technology, a user may easily control an IoT device without restrictions of time and place.

In order to use the IoT technology, a procedure of registering a thing in an electronic device such as a remote control device and/or a server such as a smartphone is required.

In the related art, an application installed in a smartphone or the like is utilized for the registration of a thing. A user may execute an application capable of registering a thing, search a nearby thing, select a desired thing to be registered among things included in a registrable list of things, and register the object in an electronic device such as a smart phone and/or a server.

However, if a lot of user inputs are requested, the user may feel uncomfortable.

If a thing located within another house adjacent to a thing located within a house of a user is included in the registrable list of things, the user may feel confusion.

DISCLOSURE

Technical Problem

It is an object of the disclosure to provide a remote control device, a display device, and a remote control system including the same, which may register a device to be controlled with minimum user intervention.

Technical Solution

A display system may include a remote control device configured to receive, from an external device, identification information about the external device, recognize an angle of communication with the external device, and transmit the identification information and information about the angle to the display device and a display device configured to identify the external device based on the identification information, determine an orientation state of the remote control device based on the information about the angle, and register the identified external device as an operable external device based on the remote control device being determined to have received the identification information while oriented toward the external device.

The display device may search the external device through wireless communication and provide guide information to guide the remote control device to be oriented toward the searched external device.

The display device may, based on the remote control device being determined to be oriented toward the pre-registered external device based on the information about the angle, transmit information about a control code to control the pre-registered external device to the remote control device.

The display device may, based on the remote control device being determined to be changed from a state of being oriented toward a pre-registered first external device to a state of being oriented toward a pre-registered second external device based on the information about the angle, transmit the information about a control code to control the pre-registered second external device to the remote control device.

The remote control device may, based on the orientation state being changed, provide a preset feedback effect, and the preset feedback effect may include at least one of an effect to flick a light emitter provided in the remote control device, an effect to output a preset audio, or an effect to provide a preset vibration.

The remote control device may, based on receiving the information about the control code, set a function mapped to a button of the remote control device to correspond to the control code.

The remote control device may, based on receiving information about the control code, display a screen including a user interface (UI) corresponding to the control code through the display of the remote control device.

The remote control device may, based on the remote control device being changed from a state of being oriented toward the pre-registered first external device to a state of being oriented toward the pre-registered second external device, sequentially display a screen including a first UI for controlling the first external device, a screen including a second UI for controlling the second external device, and a screen including the second UI.

The remote control device may, based on the information about the angle, determine a direction in which the registered external device is located with respect to the remote control device, and display a UI including information about a direction in which the registered external device is located.

The display device may transmit an infrared (IR) code for controlling the identified external device to the remote control device, based on receiving a response signal to the IR signal from the external device as the remote control device transmits an IR signal corresponding to the IR code to the external device, register the external device as an operable external device.

The display device may, based on receiving the response signal from the external device while the remote control device is located at a specific place, register the external device as an operable external device by matching the information about the specific place to the external device.

A remote control method according to an embodiment includes receiving, from an external device, identification information about the external device and recognizing an angle of communication with the external device, identifying the external device based on the identification information, and determining an orientation state of a remote control device based on the information about the angle, and based on the remote control device being determined to have received the identification information while oriented toward the external device, registering the identified external device as an operable external device, and the remote control method may further include, based on the remote control device being determined to be oriented toward the registered external device based on the information about the angle, displaying a screen including a user interface (UI) for controlling the registered external device.

The displaying may include, based on the remote control device being determined to be changed from a state of being oriented toward a pre-registered first external device to a state of being oriented toward a pre-registered second external device based on the information about the angle, displaying a screen including a UI for controlling the pre-registered second external device.

The method may further include, based on the orientation state being changed, providing a preset feedback effect, the preset feedback effect includes at least one of an effect to flick a light emitter provided in the remote control device, an effect to output a preset audio, or an effect to provide a preset vibration.

The displaying may include, based on the remote control device being changed from a state of being oriented toward the pre-registered first external device to a state of being oriented toward the pre-registered second external device, sequentially displaying a screen including a first UI for controlling the first external device, a screen including the first UI and a second UI for controlling the second external device, and a screen including the second UI.

The displaying may include, based on the information about the angle, determining a direction in which the registered external device is located with respect to the remote control device, and displaying a UI including information about a direction in which the registered external device is located.

The registering may include transmitting an infrared (IR) code for controlling the identified external device to the remote control device, based on receiving a response signal to the IR signal from the external device, registering the external device as an operable external device.

A computer readable medium according to an embodiment may store computer executable instructions to control the display device, when executed by a processor of the display device, to execute the steps of receiving, from a remote control device, identification information about the external device received by the remote control device from the external device and information about an angle of communication with the external device by the remote control device, identifying the external device, based on the identification information, and determining an orientation state of a remote control device based on the information about the angle, and based on the remote control device being determined to have received the identification information while oriented toward the external device, registering the identified external device as an operable external device.

The registering may include transmitting an infrared (IR) code for controlling the identified external device to the remote control device, based on receiving a response signal to the IR signal from the external device as the remote control device transmits an IR signal corresponding to the IR code to the external device, registering the external device as an operable external device.

The computer-readable medium may further include computer executable instructions to execute, based on the remote control device being determined to be oriented toward a pre-registered external device, transmitting information about a control code to control the pre-registered external device to the remote control device.

Effect of Invention

According to various embodiments, a device to be controlled may be registered with minimum user intervention.

Once a remote control device is oriented toward the device to be controlled, the remote control device displays a user interface (UI) corresponding to the device to be controlled, so that the user may conveniently control the device to be controlled.

DESCRIPTION OF DRAWINGS

FIG. 9 is a diagram illustrating a user interface (UI) for controlling an external device according to an embodiment;

FIG. 10 is a diagram illustrating an embodiment of changing and displaying a UI according to an embodiment;

BEST MODE FOR CARRYING OUT THE INVENTION

Mode for Carrying Out the Invention

The terms used in the present specification and the claims are general terms identified based on the functions of the various embodiments of the disclosure. However, these terms may vary depending on intention, technical interpretation, emergence of new technologies, and the like of those skilled in the related art. Some terms may be selected by an applicant arbitrarily. The terms used in embodiments of the disclosure may be interpreted as the meaning defined herein, and may be interpreted based on the overall contents of the disclosure and ordinary skill in the art, unless there is a specific definition of the term.

When it is decided that a detailed description for the known art related to the disclosure may unnecessarily obscure the gist of the disclosure, the detailed description may be shortened or omitted.

The embodiment of the disclosure is illustrated in detail with reference to the attached drawings and the contents of the attached drawings, but the disclosure is not restricted or limited by the embodiments.

The disclosure will be described in greater detail with reference to the attached drawings.

Figure 1:
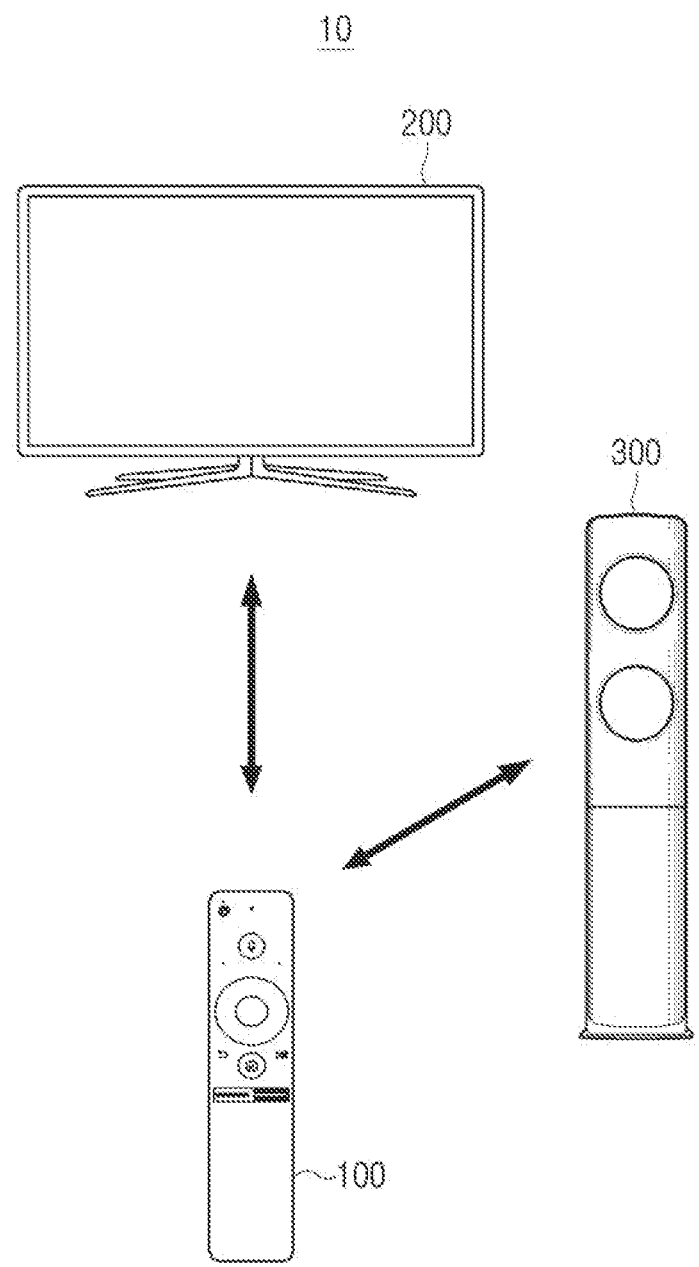
FIG. 1 is a diagram illustrating a remote control system according to an embodiment.

FIG. 1 is a diagram illustrating a remote control system according to an embodiment.

Referring to FIG. 1, a remote control system 10 according to an embodiment includes a remote control device 100, a display device 200, and at least one external device 300. The external device 300 is an electronic device to be controlled by the remote control device 100, and may be an air conditioner 300 as shown in FIG. 1. This is merely exemplary, and the external device 300 may be various electronic devices, such as a television (TV), a smart TV, a washing machine, a refrigerator, an air-purifier, a robot cleaner, a humidifier, a door lock, a dish washer, a security camera, a closed circuit television (CCTV), a security sensor, light emitting diode (LED), a lamp, a heating device, a power measuring device, a power socket, an electricity socket, a multi-tap, personal computer (PC), internet protocol (IP) camera, or the like.

The remote control device 100 may control the external device 300.

The remote control device 100 may control the external device 300 by transmitting an infrared (IR) signal for controlling the external device 300 to the external device 300 through an IR transmitter.

The remote control device 100 may control the external device 300 by establishing a communication link with the external device 300 through a communication method such as Wi-Fi, ZigBee, Z-Wave, Bluetooth, and the like, and transmitting a control signal to the external device 300 through wireless communication.

The remote control device 100 may control the external device 300 by establishing a communication link with an external electronic device (not shown) through a communication method such as Wi-Fi, mobile communication, etc., and transmitting a control signal to an external electronic device (not shown) through wireless communication. An external electronic device (not shown) may transmit a control signal received from the remote control device 100 to the external device 300.

The external electronic device (not shown) may be a server and an electronic device such as a smart TV.

As shown in FIG. 1, the remote control device 100 may be implemented with a remote controller. However, this is merely exemplary, and the remote control device 100 may be an electronic device such as a smartphone, a tablet PC, a notebook, or the like, and may be a wearable device such as a smart watch.

The external device 300 is an electronic device that may be controlled by the remote control device 100.

The external device 300, when an IR signal is received from the remote control device 100 through the IR receiver, may perform an operation corresponding to the IR signal.

The external device 300 may perform an operation corresponding to the control signal when a control signal is received from the remote control device 100 through wireless communication such as Wi-Fi, ZigBee, Z-Wave, Bluetooth, or the like.

When a control signal is received from an external electronic device (not shown), the external device 300 may perform an operation corresponding to the control signal. Here, the control signal received from an external electronic device (not shown) may be a control signal transmitted from the remote control device 100 to an external electronic device (not shown).

The external electronic device (not shown) may be a server, or an electronic device such as the smart TV, or the like.

The display device 200 may store (or register) the control code of the external device 300 for respective external devices 300. The control code may be an IR code, a key code, or the like.

The display device 200 may store information obtained by matching the control code of the external device 300 to the identification information of the external device 300 for respective external devices 300. The identification information may be various information capable of distinguishing the external device 300 from another electronic device, such as a media access control (MAC) address and a serial number.

A method of registering the external device 300 to the display device 200 will be described with reference to FIG. 2.

Figure 2:
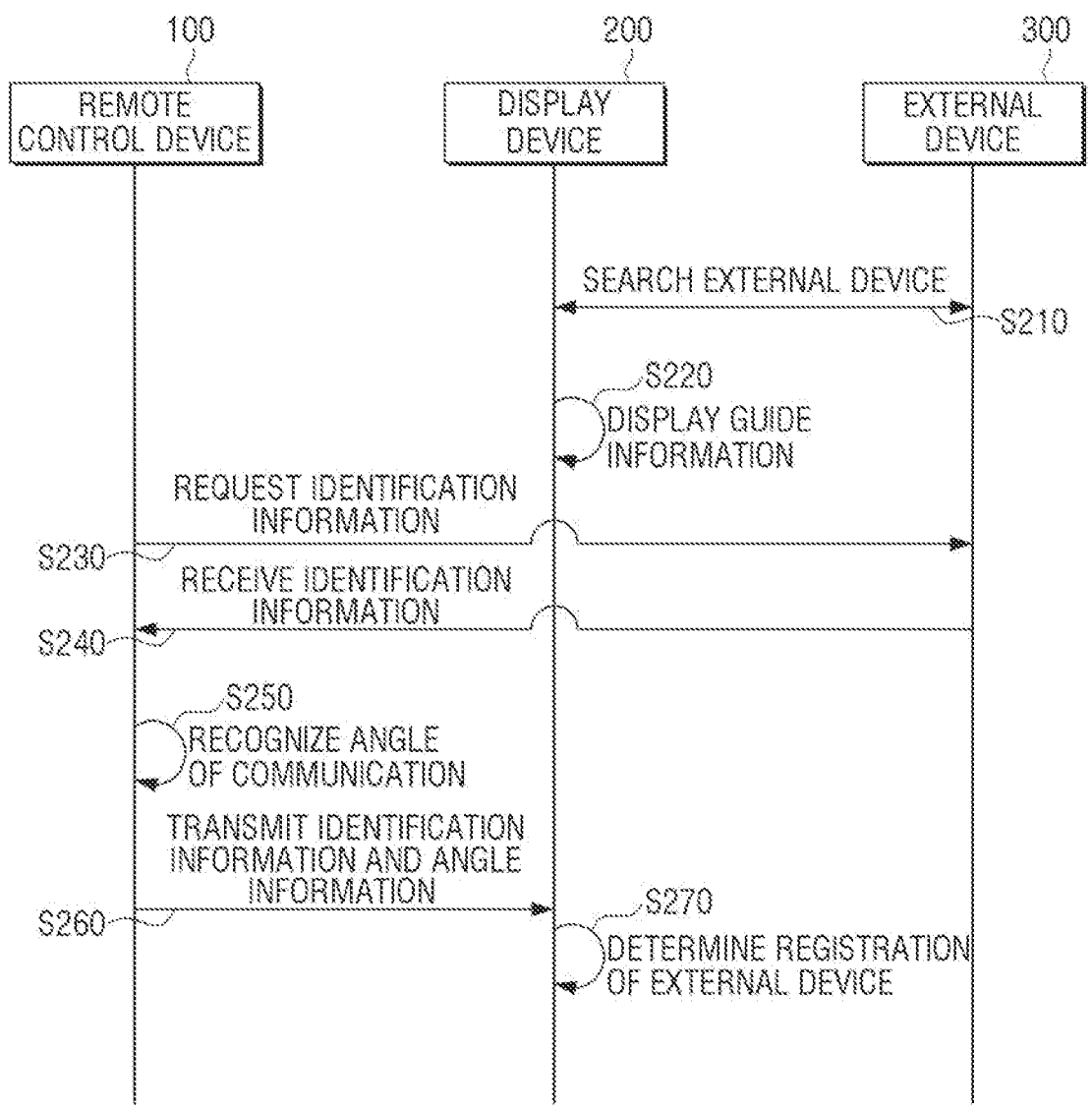
FIG. 2 is a flowchart illustrating a method for registering an external device according to an embodiment.

FIG. 2 is a flowchart illustrating a method for registering an external device according to an embodiment.

The display device 200 may search the external device 300 through wireless communication in operation S210. Specifically, the display device 200 may search the external device 300 through wireless communication, such as Wi-Fi, ZigBee, Z-Wave, Bluetooth, or the like.

When the external device 300 is searched, the display device 200 may display the guide information in operation S220. The guide information may include information for inducing the remote control device 100 to be oriented toward the searched external device 300. For example, when the air conditioner is searched, the display device 200 may display guide information, such as "toward the air conditioner, please be oriented toward the remote control device".

For example, one external device 300 may be searched, but the above technical idea may be applied to the case where the plurality of external devices 300 are searched. For example, the display device 200 may display guide information for guiding the air conditioner and the washing machine to be sequentially oriented when the air conditioner and the washing machine are searched. Alternatively, when a user command for displaying a list including an air conditioner and a washing machine and selecting one of the air conditioner and the washing machine is received from the list, guide information for guiding the selected external device to be oriented may be displayed.

The remote control device 100 may transmit a signal requesting identification information of the external device 300 to the external device 300 in operation S230. The remote control device 100 may transmit, to the external device 300, a signal for requesting identification information of the external device 300 through wireless communication such as Wi-Fi, ZigBee, Z-Wave, Bluetooth, and the like.

Thereafter, the remote control device 100 may receive the identification information of the external device 300 from the external device 300 in operation S240. The identification information may be information capable of distinguishing the external device 300 from another electronic device, such as a MAC address.

The remote control device 100 may recognize an angle in communication with the external device 300 in operation S250. Specifically, while the remote control device 100 communicates with the external device 300, the remote control device 100 may recognize an angle in communication with the external device 300 using angle of arrival (AoA) technology and may transmit the information about the recognized angle to the display device 200 while communicating with the external device 300. The detailed description related thereto will be described later.

The remote control device 100 may transmit, to the display device 200, identification information of the external device 300 and the information about the angle in communication with the external device 300 in operation S260.

The display device 200 may decide whether to register the external device 300 based on the identification information of the external device 300 and the information about the angle received from the remote control device 100 in operation S270.

The display device 200 may identify the external device 300 based on the identification information of the external device 300, and may register the external device 300 as an operable external device when it is determined that the remote control device 100 has received the identification information in a state in which the remote control device 100 is oriented toward the external device 300 based on the information about the angle.

More specifically, if the angle included in the information about the angle is within a predetermined range, the display device 200 may identify that the remote control device 100 has received the identification information while being oriented toward the external device 300. Here, the predetermined range may be set in a product release step and may be variously set and changed according to the user command. For example, a predetermined range may be from 0° to 30°.

The registration of the external device 300 to an operable external device may denote that the control code for controlling the external device 300 is matched with the identification information of the external device 300 and stored. Specifically, the display device 200 may transmit a signal requesting the control code of the external device 300 to the server (not shown) and/or the external device 300, and when the control code of the external device 300 is received from the server (not shown) and/or the external device 300, may match the received control code with the identification information of the external device 300 and store the same.

As described above, by registering the external device 300 through a method of directing the remote control device 100 without requiring a plurality of user inputs, the embodiment may increase user convenience. Since the external device 300 is registered through a method for orienting the remote control device 100, a user may intuitively register an external device desired to be registered.

Figure 3:
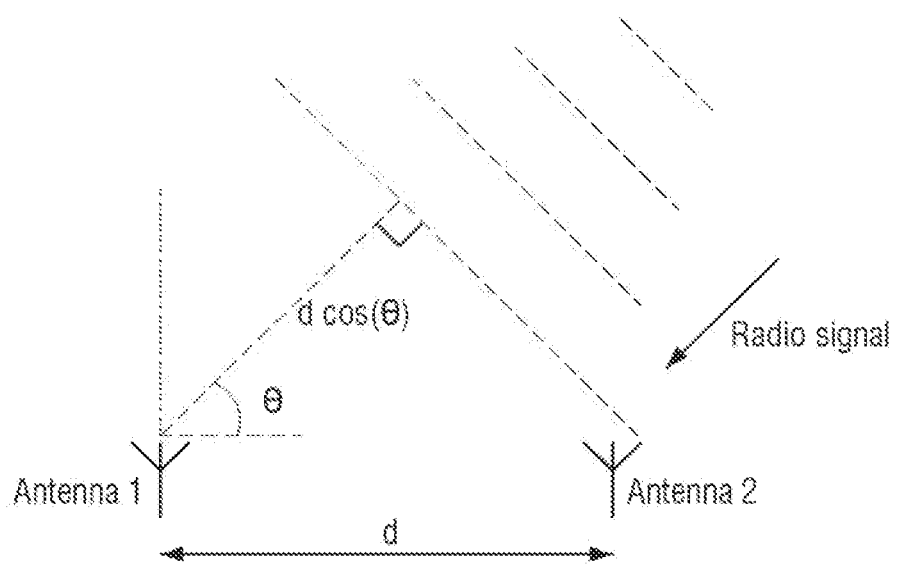
FIGS. 3 to 5 illustrate embodiments of registering an external device based on orientation of a remote control device according to an embodiment.
Figure 4A:
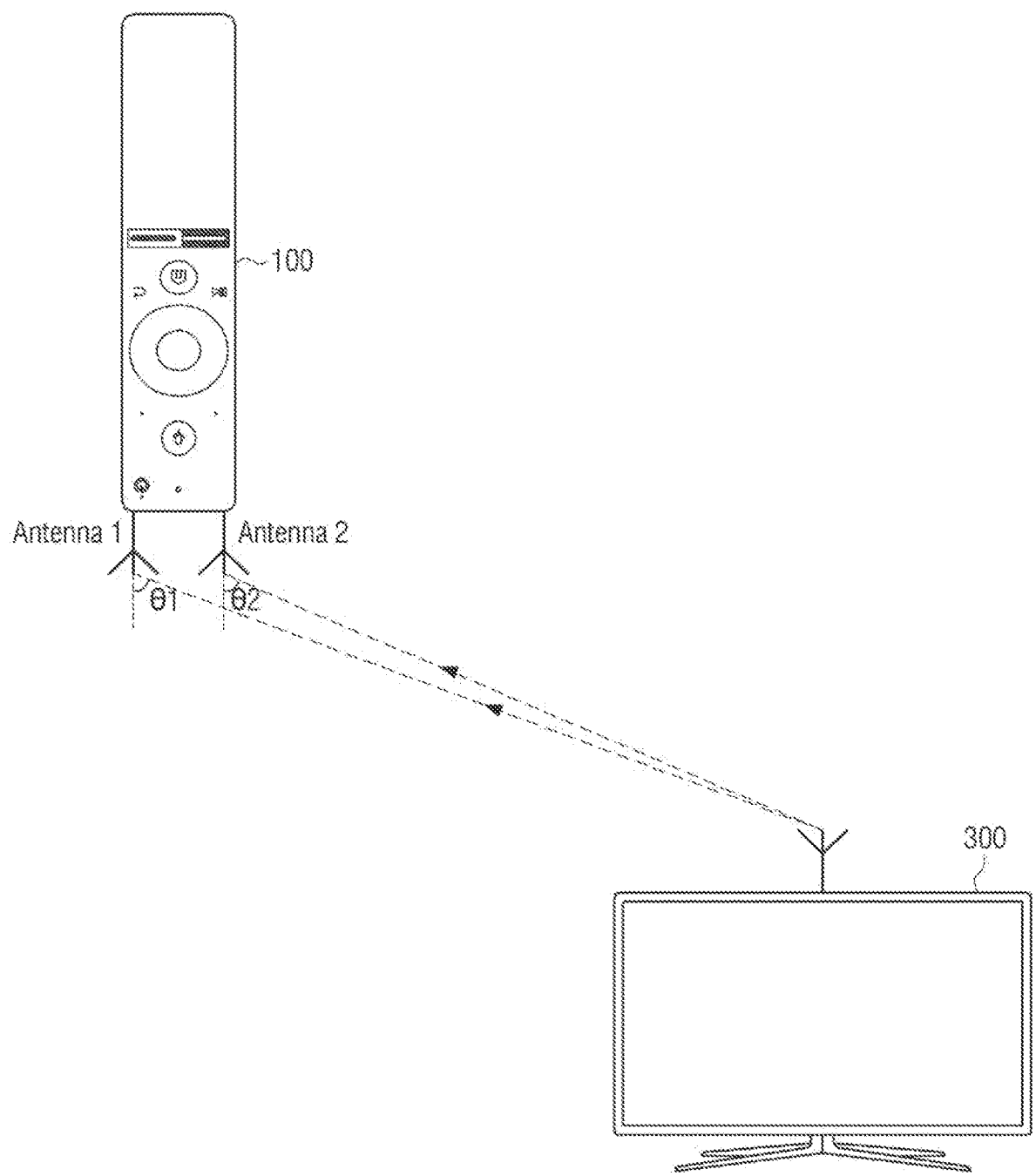
Figure 4B:
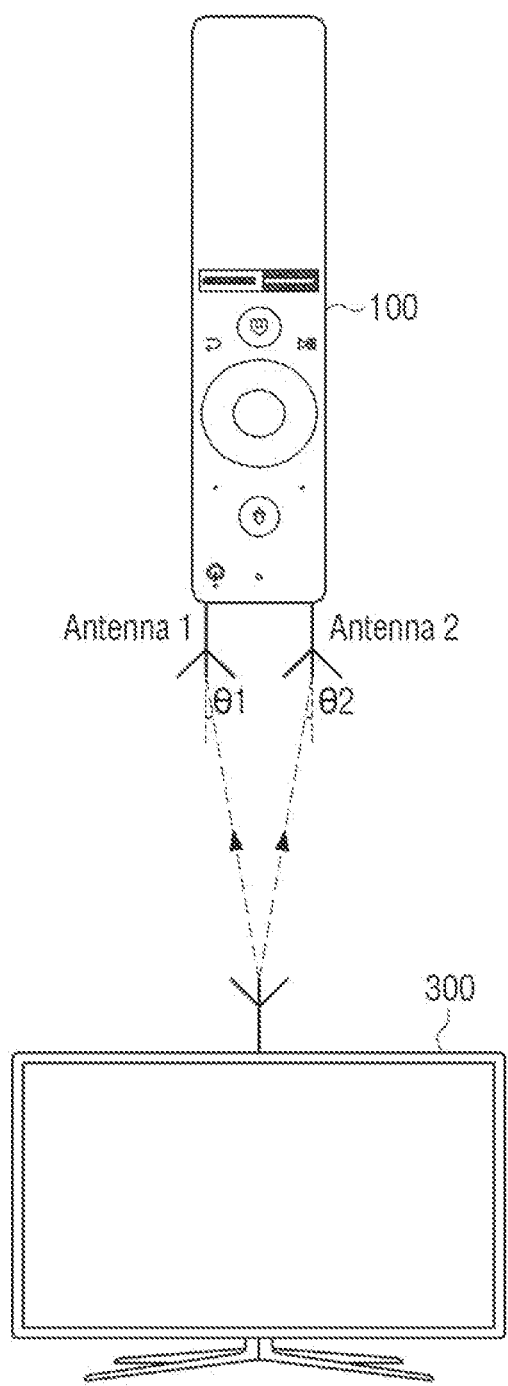
Figure 5:
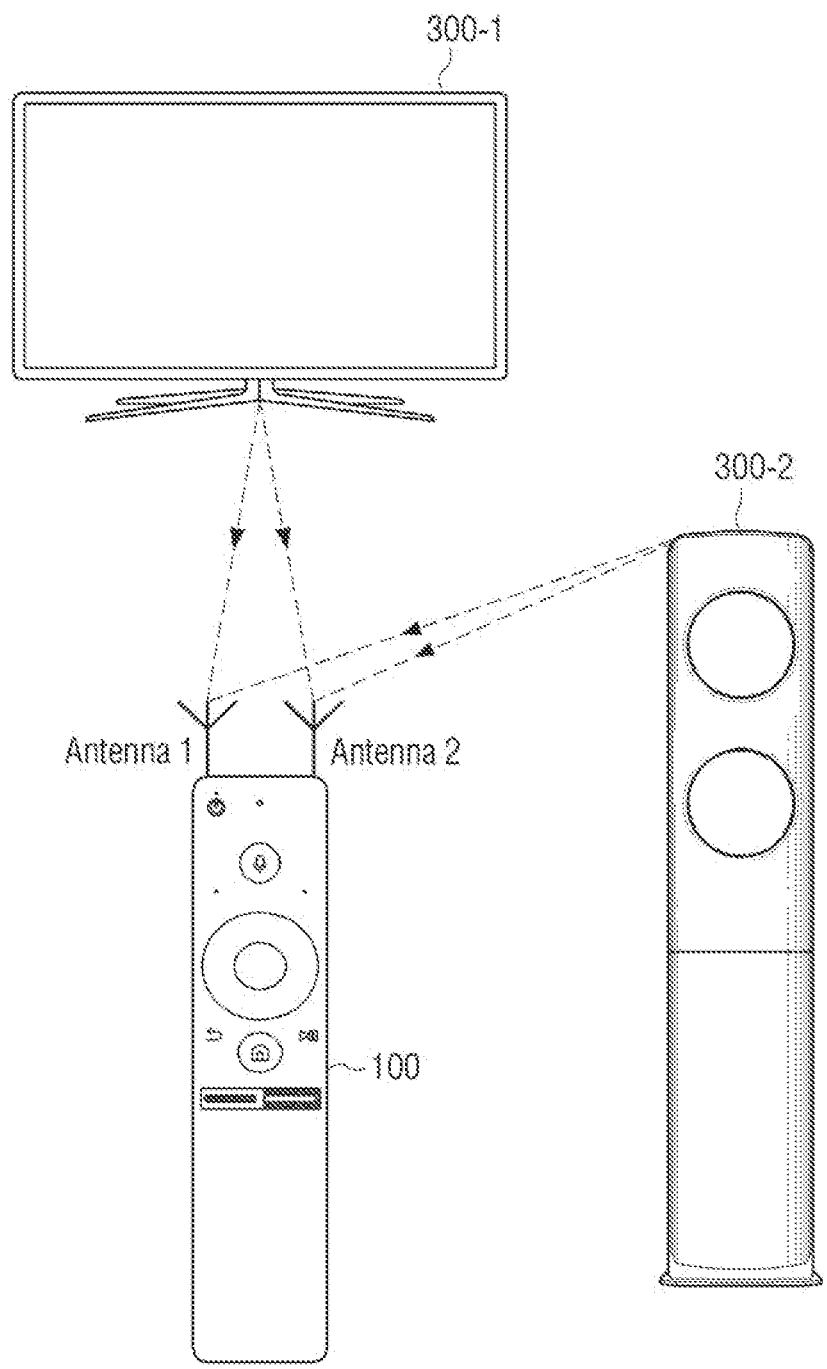

FIGS. 3 to 5 illustrate embodiments of registering an external device based on orientation of a remote control device according to an embodiment.

The remote control device 100 may recognize an angle of communication with an external device. The remote control device 100 may determine an angle of communication with the external device 300 using an angle-of-arrival (AoA) technology. The AoA may denote a positioning method for deciding an angle at which a wireless signal is received by measuring the AoA of the received wireless signal.

The remote control device 100 may include a directional antenna. The directional antenna may be implemented as parallel antennas including at least two antennas. This is merely exemplary and the type of the directional antenna is not limited thereto, and the directional antenna may be implemented with various types of antennas capable of receiving signals in a specific direction.

The directional antenna may be provided at one side of the remote control device 100. For example, the directional antenna may be provided on an upper side portion of the remote control device 100.

Referring to FIG. 3, when a signal is received at two directional antennas having a distance d, the remote control device 100 may determine an incident angle θ of a signal received through respective antennas using the following equation:

$$\psi = (2\pi d \cos(\theta))/\lambda$$

$$\theta = \cos^{-1}((\psi\lambda)/(2\pi d))$$ [Equation]

Here, ψ may denote a phase difference and λ may denote wavelength.

As shown in FIG. 4A, rather than the angle of the wireless signal received from the external device 300 in a state where the directional antenna is not oriented toward the external device 300, the angle of the wireless signal received from the external device 300 in a state where the directional antenna is oriented toward the external device 300, as shown in FIG. 4B, may be relatively small.

As a result of determining angles of respective signals reaching two directional antennas through the AoA technology described above, if the phase of two angles is opposite and the difference of an absolute value is determined within a preset magnitude, it may be determined that the signal is received in a state where the remote control device 100 is oriented toward the external device 300.

The above embodiment is merely exemplary, and the remote control device 100 may determine the angle of the signal received from the external device 300 through various methods.

For example, the remote control device 100 may determine an angle of a signal received from the external device 300 through an amplitude comparison direction detection method that compares the amplitude magnitude of the signal reaching the two parallel antennas. The remote control device 100 may determine an angle of a signal received from the external device 300 through a phase difference direction detection method that compares the phases of signals arriving at the two parallel antennas. The remote control device 100 may determine an angle of a signal received from the external device 300 through a time difference direction detection method using a time difference reaching the two parallel antennas.

The display device 200 may register the external device 300 as an operable electronic device when it is determined that the remote control device 100 has received the identification information in a state where the remote control device 100 is oriented toward the external device 300, based on information about the communication angle between the remote control device 100 and the external device recognized by the remote control device 100 through the method described above.

For example, as shown in FIG. 5, when a first external device 300-1 and a second external device 300-2 are located in a specific space, the display device 200 may register the first external device 300-1 at a location in which the remote control device 100 orients as an operable electronic device.

In the embodiment, only an external device that a user wants to register among all external devices located within the house may be individually registered. In particular, the user convenience may be increased since the external device may be registered as an operable electronic device with only the action of orienting the remote control device toward the external device.

Figure 6:
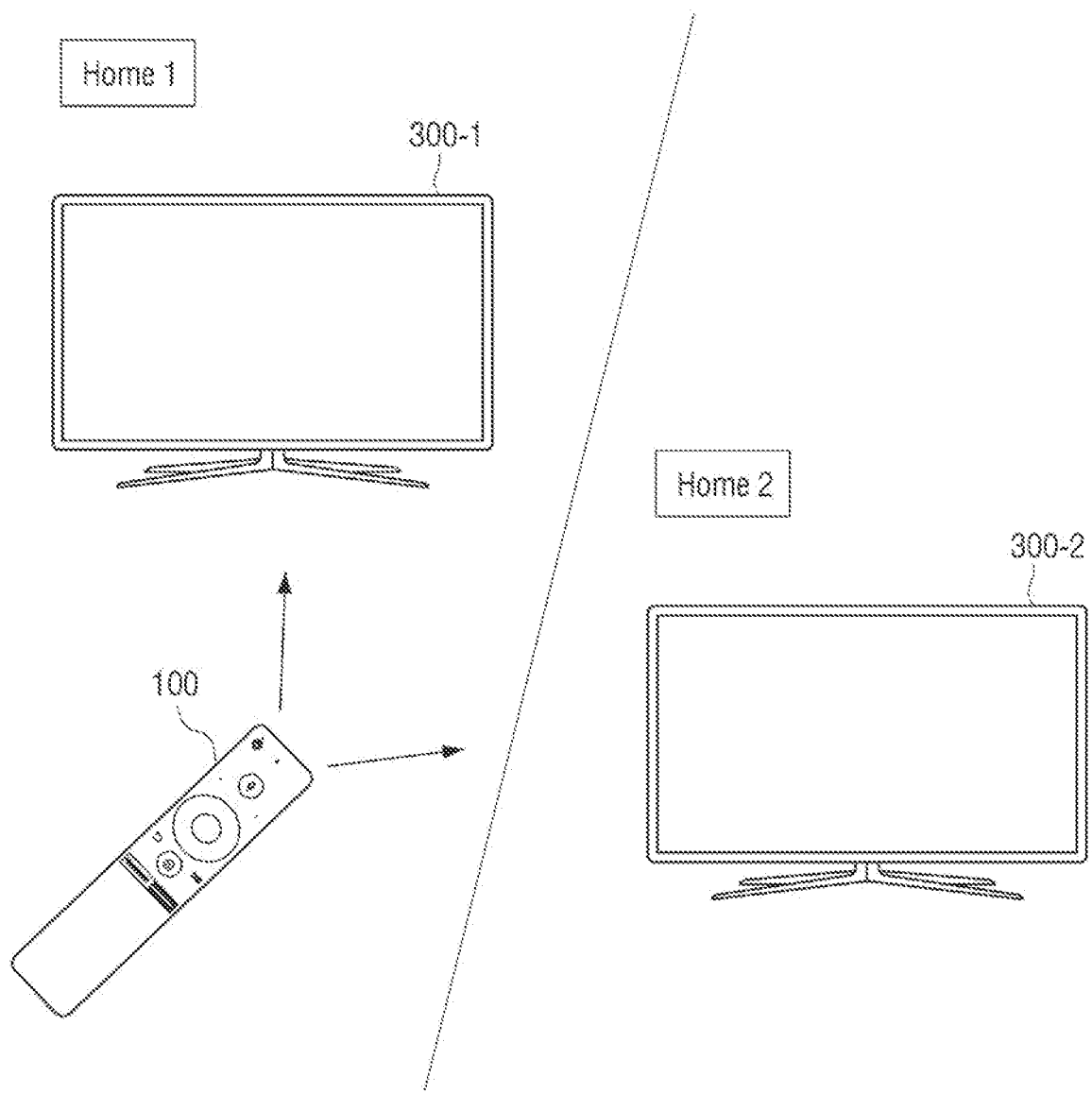
FIG. 6 is a diagram illustrating an example of registering an external device based on an IR signal according to an embodiment.

FIG. 6 is a diagram illustrating an example of registering an external device based on an IR signal according to an embodiment.

As described above, the display device 200 may determine whether to receive the identification information in a state where the remote control device 100 orients the external device 300.

If it is determined that the remote control device 100 receives the identification information while the remote control device 100 is oriented toward the external device 300, the display device 200 may transmit an IR code for controlling the external device 300 to the remote control device 100. The IR code may include information about a code requesting a response.

The display device 200 may receive an IR code for controlling the external device 300 from the server (not shown) and/or the external device 300.

When the remote control device 100 transmits an IR signal corresponding to the IR code to the external device 300, if the response signal for the IR signal is received from the external device 300, the display device 200 may register the external device 300 as an operable external device.

The display device 200 may match and store the control code of the external device 300 with the identification information of the external device 300.

If the response signal is not received from the external device 300, the display device 200 may delete the IR code received from the server (not shown) and/or the external device 300, and may not register the external device 300.

The external device located within the house of the user may be registered separately from an external device located in adjacent another house.

For example, as shown in FIG. 6, when the first external device 300-1 is located at Home 1 where the user resides, and the second external device 300-2 is located at Home 2 adjacent to Home 1, only the first external device 300-1 capable of IR communication as the operable device. This is due to the feature of an IR signal that may not pass through an obstacle, such as a wall.

Figure 7A:
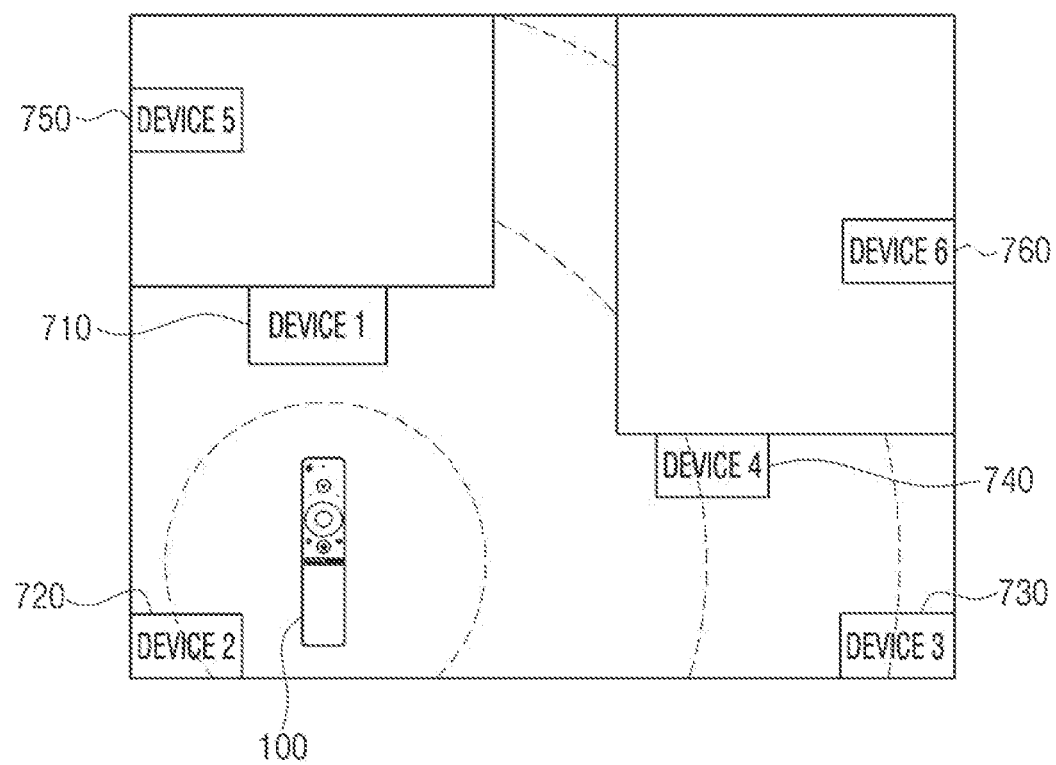
FIGS. 7A and 7B are diagrams illustrating an embodiment of registering an external device by matching information about a place according to an embodiment.
Figure 7B:
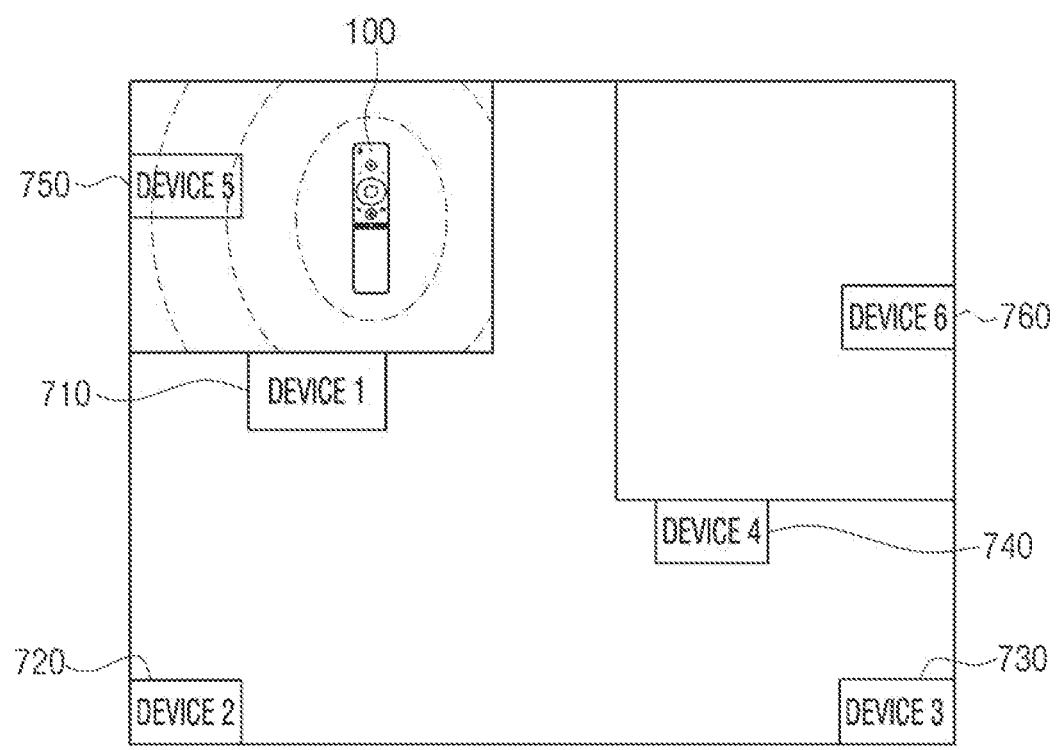

FIGS. 7A and 7B are diagrams illustrating an embodiment of registering an external device by matching information about a place according to an embodiment.

The display device 200 may match information about a place and register the external device 300.

The display device 200 may, based on receiving the response signal from the external device 300 while the remote control device 100 is located at a specific place, register the external device 300 as an operable external device by matching the information about the specific place to the identification information of the external device 300. The response signal may refer to a response signal for an IR signal.

For example, referring to FIG. 7A, a plurality of external devices 710-760 may be located within the house. When the remote control device 100 is located in the first space, the display device 200 may receive a response signal from the first to fourth electronic devices 710 to 740.

An IR signal requesting a response may be transmitted to the first to fourth external devices 710 to 740 located in the same space as the remote control device 100, but due to the feature of the IR signal that may not pass through a wall or a door present within the house, the signal may not be transmitted to fifth and sixth external devices 750 and 760 located in another space distinguished from the first space.

The display device 200 may register the first to fourth external devices 710 to 740 as an operable electronic device by matching information about the first space to the first to fourth external devices 710 to 740 transmitting the response signal.

Similarly, as shown in FIG. 7B, when the remote control device 100 is located in the second space, the display device 200 may receive the response signal from the fifth external device 750, match the information about the second space with the identification information of the fifth external device 750, and register the fifth external device 750 as the operable electronic device.

A name corresponding to respective spaces may be set according to a user command. For example, when a user command for setting the first space to the living room is received, the display device 200 may match and register the living room with identification information of the first to fourth external devices 710 to 740, and when a user command for setting the second space to the room is received, the display device 200 may match and register the room with identification information of the fifth external device 750.

As described above, by registering an external device by matching information on a specific place, a user may control the external device in consideration of a place where the external device is located. In particular, when there are a plurality of external devices of the same name as a bulb within the house, the embodiment may divide and control the bulb in the living room and the bulb in the room separately, thereby increasing user convenience.

Figure 8:
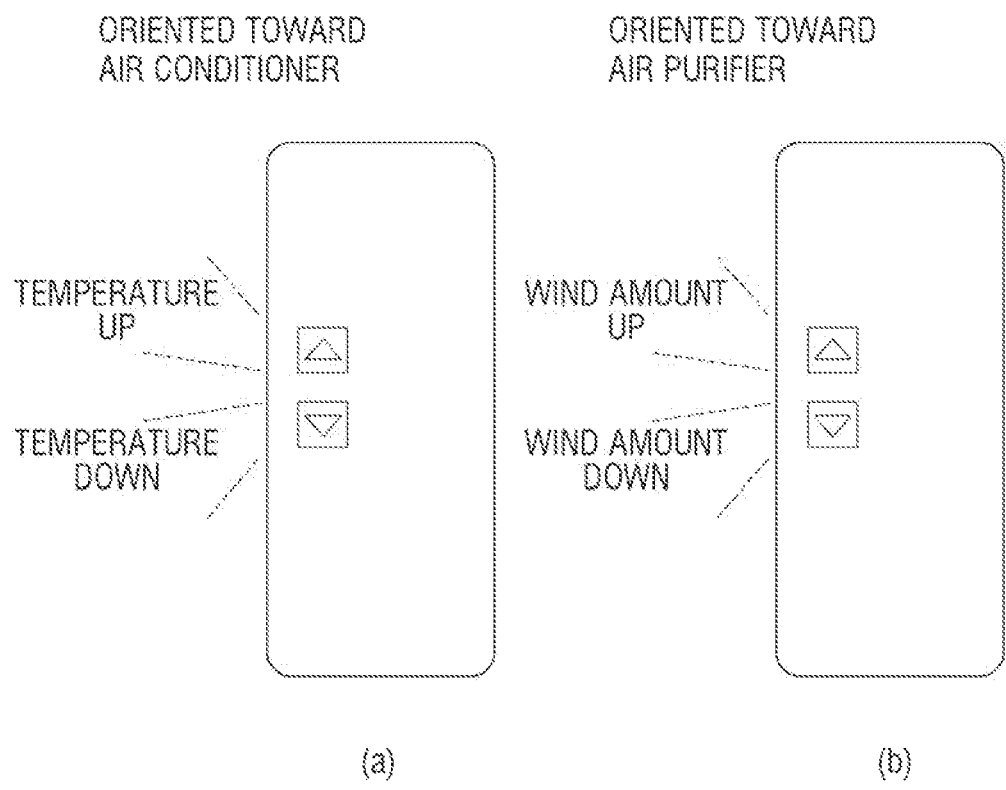
FIG. 8 is a diagram illustrating a function mapped to a button of a remote control device according to an embodiment.

FIG. 8 is a diagram illustrating a function mapped to a button of a remote control device according to an embodiment.

As described above, the display device 200 may register the external device 300 as the operable electronic device.

After the user command is input to the remote control device 100, the remote control device 100 may communicate with the external device 300 to receive the identification information of the external device 300 from the external device 300. Here, the external device 300 may be an external device registered as an operable electronic device.

The remote control device 100 may transmit the identification information about the external device 300 and the information about a communication angle with the external device 300 to the display device 200.

For example, when a user command for changing a function mapped to a button of the remote control device 100 to correspond to the pre-registered external device 300 is received, the remote control device 100 may communicate with a pre-registered external device 300, and may transmit the identification information of the external device 300 received from the external device 300 and information on the communication angle with the external device 300 to the display device 200.

The display device 200 may identify the external device 300 based on the identification information and may determine whether the remote control device 100 is oriented toward the pre-registered external device 300 based on the information about the communication angle. If the communication angle is within a predetermined range, the display device 200 may determine that the remote control device is oriented toward the pre-registered external device 300.

The display device 200 may transmit, to the remote control device 100, a control code corresponding to the identified external device 300 among the control codes stored by external devices.

The remote control device 100 may then, when a control code corresponding to the external device 300 is received, set a function mapped to the button of the remote control device 100 to correspond to the external device 300 based on the received control code.

As described above, the embodiment may set the function mapped to the button of the remote control device 100 to correspond to the external device 300 only by the action of orienting the remote control device 100 toward the external device 300 to be controlled, so that the user may conveniently control the external device 300.

If it is determined that a state is changed from the state that the remote control device 100 is oriented toward the pre-registered first external device to the state that the remote control device 100 is oriented toward the pre-registered second external device, based on the information about the angle received from the remote control device 100, the display device 200 may transmit information about the control code for controlling the pre-registered second external device to the remote control device 100.

The remote control device 100 may change a function mapped to the button of the remote control device 100. The remote control device 100 may change the control code corresponding to the first external device mapped to the button to the control code corresponding to the second external device.

For example, referring to FIG. 8, when the remote control device 100 is oriented toward the air conditioner based on the information about the control code received from the display device 200, the remote control device 100 may set the function mapped to the channel adjustment button as a temperature control function, and when the remote control device 100 orients the air purifier, the remote control device 100 may set the function mapped to the channel adjustment button to the air volume control function.

In this example, the remote control device 100 may provide a predetermined feedback effect. The remote control device 100 may provide at least one of turning on the light emitting unit provided in the remote control device 100 when the orientation state is changed, that is, changing the function mapped to the button of the remote control device 100, outputting preset audio through the speaker, or providing the predetermined vibration.

The remote control device 100 may include an LED light emitting unit, an LCD light emitting unit, the speaker, the vibration sensor, or the like.

The user may recognize that the function mapped to the button of the remote control device 100 is changed, and may control the external device 300 to be controlled.

When a user command for inputting a button of the remote control device 100 is received, the remote control device 100 may output audio corresponding to a function mapped to the button through a speaker.

As the embodiment above, if the external device 30 is an air conditioner, the remote control device 100, when a channel adjustment button is input, may output "temperature up" or "temperature down" which is an audio corresponding to a function mapped to a channel adjustment button through the speaker.

The user may intuitively recognize a function which the remote control device 100 is performing.

FIG. 9 is a diagram illustrating a user interface (UI) for controlling an external device according to an embodiment.

As described above, when the remote control device 100 is oriented toward the external device 300, the display device 200 may transmit a control code corresponding to the external device 300 to the remote control device 100.

In this example, the remote control device 100 may display a screen including a UI for controlling the external device 300 through the display.

When information on the control code is received from the display device 200, the remote control device 100 may display a screen including the UI corresponding to the control code through the display.

The UI may be different depending on the orientation state of the remote control device 100. When the remote control device 100 orients the first external device, the remote control device 100 may display the UI corresponding to the first external device through the display and when the second external device is oriented, the remote control device 100 may display the UI corresponding to the second external device through the display.

For example, referring to FIG. 9, the remote control device 100 may display a screen including a channel adjustment UI, a volume adjustment UI, and a number UI through a display when the TV is oriented, and may display a volume adjustment UI and a progress bar UI through a display when the speaker is oriented.

As described above, since the embodiment may display the UI corresponding to the external device only with the action of orienting the remote control device 100 toward the electronic device to be controlled, the user may conveniently control the electronic device.

FIG. 10 is a diagram illustrating an embodiment of changing and displaying a UI according to an embodiment.

As illustrated in FIG. 10, the first to sixth external devices according to an embodiment may be located within a room.

In this example, as shown in FIG. 10A, when the remote control device 100 is oriented toward the first external device, the remote control device 100 may display the first UI corresponding to the first electronic device through the display. For example, when the first external device is a television (TV), the remote control device 100 may display a screen including a channel adjustment UI, a volume adjustment UI, and a number UI through a display, as shown in FIG. 10A.

In order to orient the remote control device 100 toward the second electronic device, as shown in FIG. 10B, when the remote control device 100 is rotated clockwise, the remote control device 100 may display the first UI and the second UI corresponding to the second external device through the display. For example, when the second external device is a speaker, the remote control device 100 may display a screen including a channel adjustment UI, a volume adjustment UI, and a number UI on the left side as shown in FIG. 10B, and may display a screen including a volume adjustment UI and a progress bar UI on the right side.

When a region between the first and second external devices is oriented, the remote control device 100 may transmit the identification information of each of the first and second external devices to the display device 200, and may receive a control code corresponding to respective first and second external devices from the display device 200.

The remote control device 100 may determine a direction of the first and second external devices about the remote control device 100 based on the communication angle with the first external device and the communication angle with the second external device, and display the first UI corresponding to the first external device on the left side of the screen and display the second UI corresponding to the second external device on the right side of the screen.

After the remote control device 100 is oriented toward the second external device, as shown in FIG. 10C, the remote control device 100 may display the second UI corresponding to the second external device through the display.

As described above, by sequentially changing the UI according to the rotation of the remote control device 100, the user may intuitively recognize that the function of the remote control device is changed to correspond to the external device to be controlled.

Figure 11:
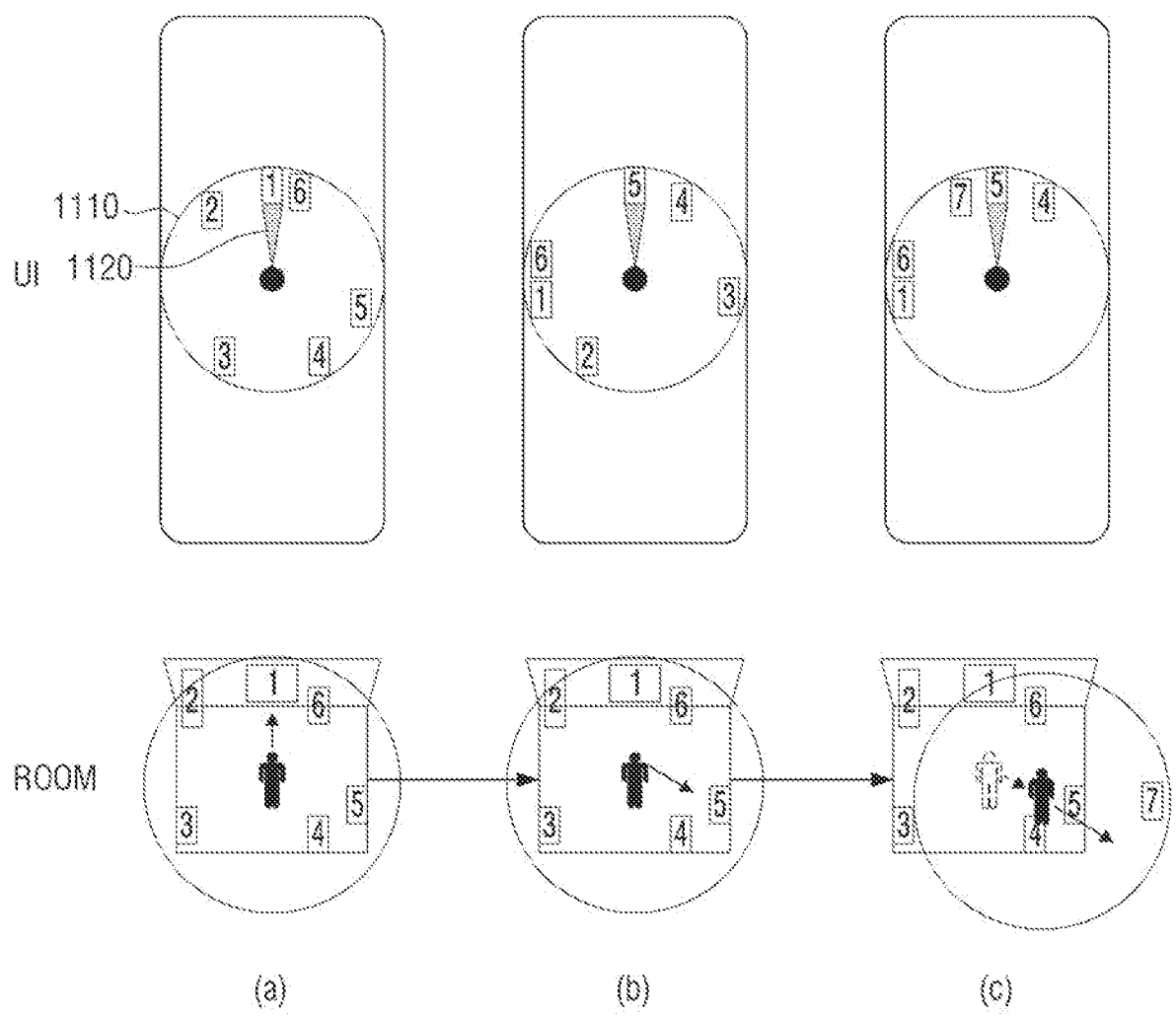
FIGS. 11 and 12 are diagrams illustrating a map UI indicating location information of an external device according to an embodiment.
Figure 12:
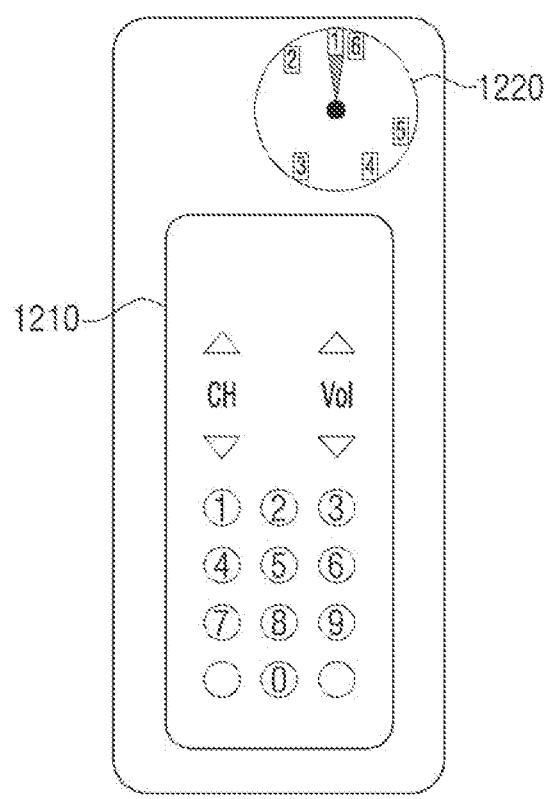

FIGS. 11 and 12 are diagrams illustrating a map UI indicating location information of an external device according to an embodiment.

When receiving identification information from a plurality of external devices, the remote control device 100 may determine a direction in which each external device is located about the remote control device 100 based on a communication angle with each external device.

The remote control device 100 may display a map UI indicating the location information of the external device based on a direction in which respective external devices are located about the remote control device 100.

For example, when the remote control device 100 orients the first external device, when the first to sixth external devices are located in the counter-clockwise direction about the remote control device 100, the remote control device 100 may display a map UI 1110 in which UIs respectively corresponding to the second to sixth external devices are arranged in the counter-clockwise direction on the basis of the UIs respectively corresponding to the first external device, through the display as shown in FIG. 11A).

The remote control device 100 may display an indicator 1120 indicating that the remote control device 100 is oriented toward the first external device by overlapping with the map UI, as illustrated in FIG. 11A.

The user may intuitively recognize the control target of the current remote control device and locations of the plurality of respective devices.

Referring to FIG. 11B, when the remote control device 100 is oriented toward a fifth external device, the remote control device 100 may display, with respect to the UI corresponding to the fifth electronic device, may display the map UI in which the UIs corresponding to remaining external devices are arranged in a counterclockwise direction, and the indicator indicating that the fifth external device is oriented to be overlapped on the map UI.

The UIs corresponding to respective external devices included in the map UI may change according to the moving of the remote control device 100.

When the remote control device 100 is moved while the first external device is connected to the remote control device 100, the first external device is disconnected from the remote control device 100, and when the second external device may be disconnected from the remote control device 100, and when the second external device is newly connected to the remote control device 100, the remote control device 100 may remove the UI corresponding to the first external device from the MAP UI, and display the UI corresponding to the second external device on the MAP UI.

For example, as illustrated in FIG. 11C, while the first to sixth external devices are communicatively connected to the remote control device 100, as the remote control device 100 is moved in a direction where the fifth external device is located, the first and second external devices may be disconnected from the remote control device 100, and when the seventh external device is newly connected to the remote control device 100, the remote control device 100 may remove the UI corresponding to each of the first and second external devices from the map UI, and display the UI corresponding to the seventh external device on the map UI.

The user may easily identify a new external device communicatively connected according to moving of the remote control device.

The map UI according to an embodiment may be displayed with a UI for controlling an external device. For example, as shown in FIG. 12, when the remote control device 100 orients the TV, the remote control device 100 may display a UI 1210 and the map UI 1220 for controlling the TV through the display.

Figure 13:
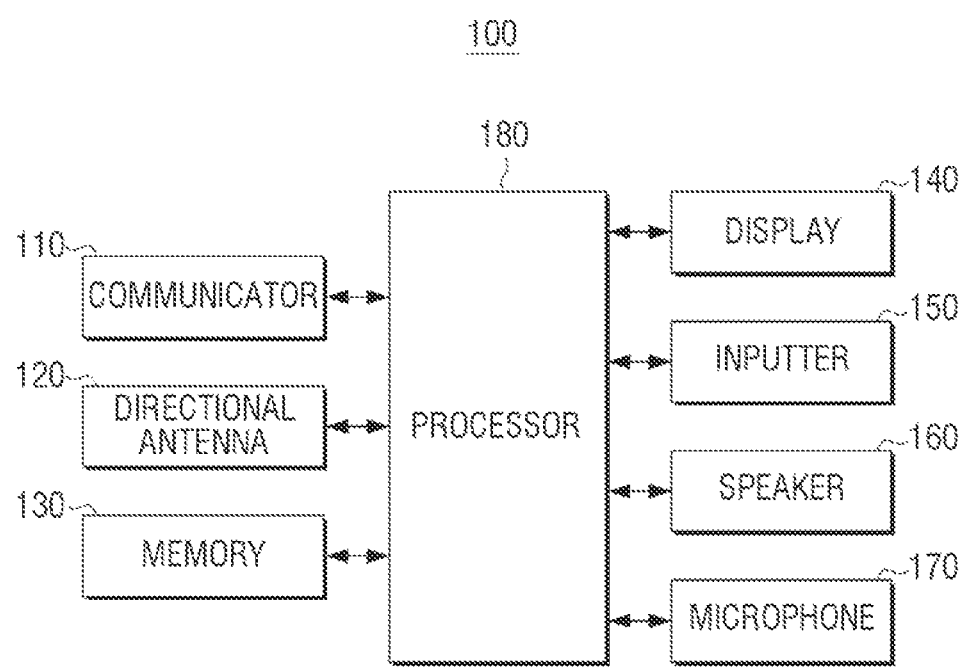
FIG. 13 is a block diagram illustrating a remote control device according to an embodiment.

FIG. 13 is a block diagram illustrating a remote control device according to an embodiment.

Referring to FIG. 13, the remote control device 100 according to an embodiment may include a communicator 110, a directional antenna 120, a memory 130, a display 140, an inputter 150, a speaker 160, a microphone 170, and a processor 180.

The communicator 110 is configured to communicate with various electronic devices. For example, the communicator 110 may communicate with various electronic devices through communication methods such as Bluetooth (BT), Bluetooth low energy (BLE), wireless fidelity (Wi-Fi), or Zigbee, or infrared (IR) communication method.

The communicator 110 may receive identification information of the external device 300 from the external device 300. The communicator 110 may transmit a control signal for controlling the external device 300 to the external device 300. Here, the control signal may be a signal for controlling on, off, etc. of the power of the external device 300.

The communicator 110 may transmit an IR threat signal requesting a response to the external device 300. The IR signal requesting the response may be a signal for identifying whether infrared communication between the remote control device 100 and the external device 300 is normally performed.

The directional antenna 120 is configured to recognize a communication angle between the remote control device 100 and the external device 300. The processor 180 may identify an angle at which the directional antenna 120 communicates with the external device 300 using an AoA technology or the like. The AoA technology may denote a positioning method for determining an angle in which a wireless signal is received by measuring the angle of arrival (AoA) of the received wireless signal.

The directional antenna 120 may be implemented as parallel antennas including at least two antennas.

The memory 130 may store various modules for driving the remote control device 100. For example, the memory 130 may store software including a base module, a sensing module, a communication module, a presentation module, a web browser module, and a service module. The base module is a module to process signals transmitted from each of the hardware included in the remote control device 100 and transmit the processed signals to the upper layer module. The sensing module may collect information from various sensors, analyze and manages the collected information, and may include a face recognition module, a voice recognition module, a motion recognition module, a near field communication (NFC) recognition module, an object recognition module, and the like. The presentation module is a module to configure a display screen and may include a UI rendering module that performs UI and graphics processing. The communication module is a module for performing communication with an external device. The web browser module refers to a module that performs web browsing and accesses the web server. The service module is a module that includes various applications for providing various services.

The display may display various images. For example, the display 140 may display various UIs such as a UI for controlling the external device 300, a map UI representing direction information of the external device 300, or the like.

The display 140 may be implemented as a display of various types such as a liquid crystal display (LCD), plasma display panel (PDP), a light emitting diode (LED), or the like. In the display 140, a backlight unit, a driving circuit which may be implemented as an a-si TFT, low temperature poly silicon (LTPS) TFT, organic TFT (OTFT), or the like, may be included as well. In the meantime, the display 140 may be implemented as a touch screen coupled with a touch sensor.

The inputter 150 may receive a user input. For example, the inputter 150 may receive a user input for registration of the external device 300. When a user command for registration of the external device 300 is received through the inputter 150, the processor 180 may transmit a signal requesting identification information to the external device 300, and transmit the identification information received from the external device and information on a communication angle with the external device 300 to the display device 200. The inputter 175 may include a button and a touch screen.

The speaker 160 may be configured to output various audio data for which various processing operations such as decoding, amplification, noise filtering, or the like, are performed by an audio processor (not shown). The speaker 160 may output various alarm sounds or voice messages as well as various audio data. According to an embodiment, the speaker 160 may output audio when the remote control device 100 which was performing a function to control the first external device is changed to a function to control the second external device.

The speaker 160 may output audio when the angle of the wireless signal received from the external device 300 is within a preset angle range, or the registration of the external device 300 is completed.

The microphone 170 may receive user voice. The user voice may be various voices such as user voice for registration of the external device 300, user voice for controlling the external device 300, and the like.

The sensor (not shown) may detect a movement of the remote control device 100. The sensor (not shown) may be implemented as an acceleration sensor, a gyro sensor, or a geomagnetic sensor and may detect a movement of the electronic device 100.

The processor 180 may control overall operations of the remote control device 100. The processor 180 may include one or more of a central processing unit (CPU), an application processor (AP), or a communication processor (CP).

It has been described that the external device 300 is registered in the display device 200 as an operable electronic device, but the external electronic device 300 may be registered in the remote control device 100.

When a user command for registration of the external device 300 is received, the processor 180 may control the communicator 110 to transmit a signal requesting identification information to the external device 300.

The processor 130, when identification information is received from the external device 300, may identify the external device 300 based on the identification information and may recognize an angle of communicating with the external device 300.

The processor 180 may register the identified external device 300 as the operable external device 300 when it is identified that the remote control device 100 has received the identification information while the remote control device 100 orients the external device 300 based on the communication angle.

The processor 180 may control the display 140 to display a screen including the UI for controlling the pre-registered external device 300 when the remote control device orients the pre-registered external device 300.

The processor 180 may, based on the remote control device 100 being determined to be changed from a state of being oriented toward a pre-registered first external device to a state of being oriented toward a pre-registered second external device based on the information about the angle of communication with the external device 300, display a screen including a UI for controlling the pre-registered second external device.

When the communication angle with the first external device is within a predetermined range, the processor 180 may display a screen including the UI for controlling the second external device if the communication angle with the first external device is changed out of a predetermined range by the rotation or movement of the remote control device 100, and if the communication angle with the second external device is within a predetermined range.

The processor 180 may provide a preset feedback effect. The processor 180 may control at least one of an effect to flick a light emitter provided in the remote control device 100, an effect to output a preset audio, or an effect to provide a preset vibration.

The processor 180 may, based on the remote control device 100 being changed from a state of being oriented toward the pre-registered first external device to a state of being oriented toward the pre-registered second external device, sequentially display a screen including a first UI for controlling the first external device, a screen including the first UI and a second UI for controlling the second external device, and a screen including the second UI.

The processor 180 may sequentially display a screen including the above-described UI by identifying the direction in which the first and second external devices are located about the remote control device 100 based on information about the communication angle received from the first and second external devices, respectively.

The processor 180 may identify a direction in which the registered external device 300 is located about the remote control device 100 based on the information about the communication angle, and may display a UI including information about the direction in which the registered external device 300 is located.

When the processor 180 receives the identification information from the external device 300, the processor 180 may transmit an IR signal requesting a response to the external device 300 to the external device 300, and may register the external device 300 as an operable external device when a response signal for the IR signal is received from the external device 300.

Figure 14:
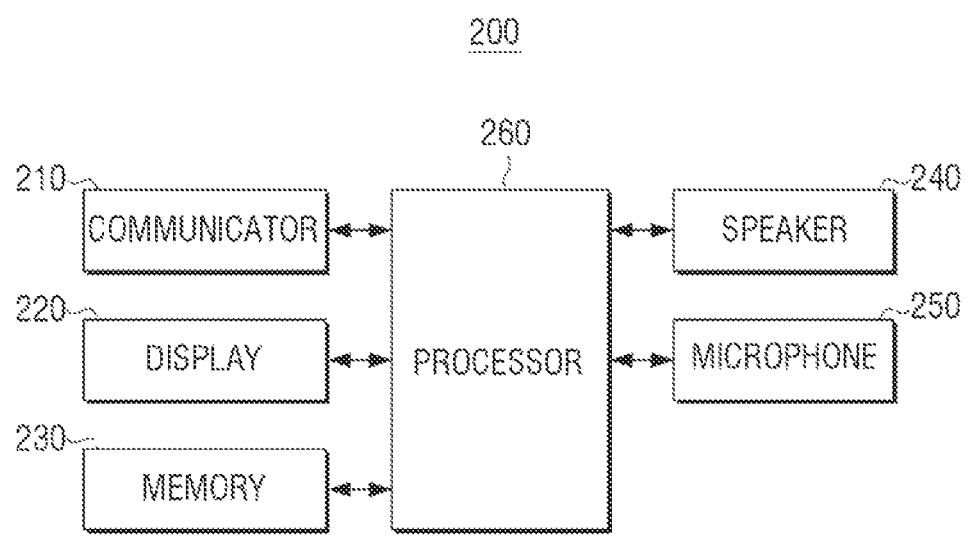
FIG. 14 is a block diagram illustrating a display device according to an embodiment.

FIG. 14 is a block diagram illustrating a display device according to an embodiment.

Referring to FIG. 14, the display device 200 may include a communicator 210, a display 220, a memory 230, a speaker 240, a microphone 250, and a processor 260.

The communicator 210 is configured to communicate with various electronic devices. For example, the communicator 210 may communicate with various electronic devices through a wireless communication method such as a Bluetooth, BLE, Wi-Fi, ZigBee, or the like, or IR communication method.

The communicator 210 may receive, from the remote control device 100, identification information of the external device 300 and information about the communication angle between the remote control device 100 and the external device 300.

The communicator 210 may receive a response signal for the IR signal from the external device 300. The IR signal is a signal for identifying whether infrared communication between the remote control device 100 and the external device 300 is normally performed, and the signal which is transmitted by the remote control device 100 to the external device 300.

The communicator 210 may include a Bluetooth chip, a Wi-Fi chip, a wireless communication chip, or the like.

The display 220 may display various images. The display 220 may display guide information guiding to orient the external device 300 searched by the communicator 210.

The display 220 may be implemented as displays in various forms such as a liquid crystal display (LCD), a plasma display panel (PDP), a light emitting diode (LED), or the like. Inside the display 220, driving circuits that may be implemented in forms such as an a-si TFT, a low temperature poly silicon (LTPS) TFT, and an organic TFT (OTFT), etc., and a backlight unit and the like may also be included together. In addition, the display 220 may also be implemented as a touch screen coupled with a touch sensor.

The memory 230 may store various modules to drive the display device 200.

The speaker 240 is configured to output various audio data for which various processing operations such as decoding, amplification, noise filtering, or the like, are performed by an audio processor (not shown). The speaker 240 may output various alarm sounds or voice messages. According to an embodiment, the speaker 240 may output audio when the external device 300 is registered as an operable device.

The microphone 250 may receive user voice. Here, the user voice may be various voices such as voice requesting a search of the external device 300. When a user voice requesting a search of the external device 300 is received through the microphone 250, the processor 260 may search the external device 300 through the communicator 210.

The processor 260 may control overall operations of the display device 200. The processor 260 may include at least one of a CPU, AP, or CP.

When identification information of the external device 300 and information regarding the communication angle between the remote control device 100 and the external device 300 are received from the remote control device 100, the processor 260 may identify the external device 300 based on the identification information.

When it is identified that the remote control device 100 orients the external device 300 based on information about the communication angle between the remote control device 100 and the external device 300, the processor 260 may register the external device 300 as an operable electronic device.

The processor 260, when identification of the pre-registered external device 300 and information regarding the communication angle between the remote control device 100 and the external device 300 are received from the remote control device 100, the processor 260 may identify the external device 300 based on the identification information, and if it is identified that the remote control device 100 orients the external device 300 based on the communication angle, the processor 260 may transmit a control code for controlling the external device 300 to the remote control device 100 on the basis of the information about the communication angle.

Figure 15:
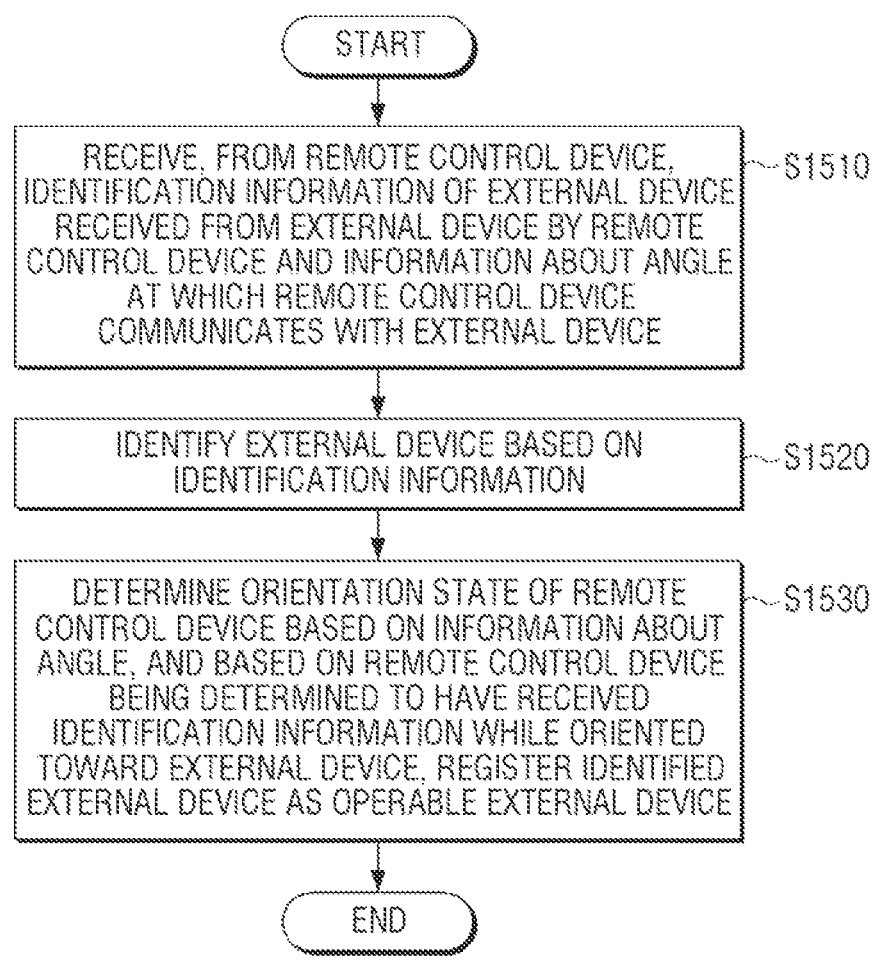
FIG. 15 is a flowchart illustrating a method of controlling a remote control device according to an embodiment.

FIG. 15 is a flowchart illustrating a method of controlling a remote control device according to an embodiment.

The display device may receive, from the remote control device, information on an angle at which the remote control device communicates with the external device and identification information of the external device received from the external device in operation S1510.

The identification information may be information for distinguishing an external device from another electronic device such as MAC address of the external device, or the like.

The angle at which the remote control device communicates with an external device may be determined through a directional antenna provided in the remote control device.

The display device may identify an external device based on the identification information in operation S1520.

The display device may determine an orientation state of the remote control device based on the information about the angle, and when the remote control device is determined to have received the identification information while oriented toward the external device, the display device may register the identified external device as an operable external device in operation S1530.

In detail, if the communication angle between the remote control device and the external device is within a predetermined range, the display device may determine that the remote control device has received the identification information while the remote control device orients the external device.

If it is determined that the remote control device orients the pre-registered external device, the display device may transmit a control code for controlling an external device to a remote control device.

A non-transitory computer readable medium stored with a program for sequentially performing a control method of a remote control device may be provided.

A non-transitory readable medium may store computer executable instructions to control the display device, when executed by a processor of the display device, to execute the steps of receiving, from a remote control device, identification information about the external device received by the remote control device from the external device and information about an angle of communication with the external device by the remote control device, identifying the external device, based on the identification information, and determining an orientation state of a remote control device based on the information about the angle, and based on the remote control device being determined to have received the identification information while oriented toward the external device, registering the identified external device as an operable external device.

The non-transitory computer-readable medium does not refer to a medium that stores data for a short period of time, such as a register, cache, memory, etc., but semi-permanently stores data and is available of reading by the device. Specifically, programs of performing the above-described various methods may be stored in a non-transitory computer readable medium such as a CD, a DVD, a hard disk, a Blu-ray disk, universal serial bus (USB), a memory card, ROM, or the like, and may be provided.

In addition, while example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. A display system comprising:
   a remote control device configured to receive, from an external device, identification information about the external device, recognize an angle of communication with the external device, and transmit the identification information and information about the angle to a display device; and
   the display device configured to identify the external device based on the identification information, determine an orientation state of the remote control device based on the information about the angle, and register the identified external device as an operable external device based on the remote control device being determined to have received the identification information while oriented toward the external device, wherein the remote control device further configured to:
identify a direction of respective external devices about the remote control device based on communication angles with the external devices, and display a map UI indicating location information of the external devices based on the direction of the respective external devices about the remote control device, the map UI comprising an indicator indicating that the remote control device is oriented toward a first external device by overlapping with the map UI, and based on the first external device being disconnected from the remote control device and a second external device being newly connected to the remote control device according to the remote control device being moved while the first external device is connected to the remote control device, remove a first UI corresponding to the first external device from the map UI and display a second UI corresponding to the second external device on the map UI.

2. The display system of claim 1, wherein the display device is further configured to search the external device through wireless communication and provide guide information to guide the remote control device to be oriented toward the searched external device.

3. The display system of claim 1, wherein the display device is further configured to, based on the remote control device being determined to be oriented toward a pre-registered external device based on the information about the angle, transmit information about a control code to control the pre-registered external device to the remote control device.

4. The display system of claim 3, wherein the display device is further configured to, based on the remote control device being determined to be changed from a first state of being oriented toward a pre-registered first external device to a second state of being oriented toward a pre-registered second external device based on the information about the angle, transmit information about a control code to control the pre-registered second external device to the remote control device.

5. The display system of claim 4, wherein the remote control device is further configured to, based on the orientation state being changed, provide a preset feedback effect, and wherein the preset feedback effect includes at least one of an effect to flick a light emitter provided in the remote control device, an effect to output a preset audio, or an effect to provide a preset vibration.

6. The display system of claim 3, wherein the remote control device is further configured to, based on receiving the information about the control code, set a function mapped to a button of the remote control device to correspond to the control code.

7. The display system of claim 3, wherein the remote control device, based on receiving information about the control code, display a first screen including a user interface (UI) corresponding to the control code through the display of the remote control device.

8. The display system of claim 7, wherein the remote control device is further configured to, based on the remote control device being changed from a first state of being oriented toward a pre-registered first external device to a second state of being oriented toward a pre-registered second external device, sequentially display a second screen including a third UI for controlling the first external device, a third screen including a fourth UI for controlling the second external device, and a fourth screen including the fourth UI.

9. The display system of claim 1, wherein the display device is further configured to transmit an infrared (IR) signal corresponding to an IR code for controlling the identified external device to the remote control device, based on receiving a response signal to the IR signal from the external device as the remote control device transmits the IR signal corresponding to the IR code to the external device, register the external device as an operable external device.

10. The display system of claim 9, wherein the display device is further configured to, based on receiving the response signal from the external device while the remote control device is located at a specific place, register the external device as the operable external device by matching information about the specific place to the external device.

11. A remote control method comprising:
receiving, from an external device, identification information about the external device and recognizing an angle of communication with the external device;
identifying the external device based on the identification information; and
determining an orientation state of a remote control device based on information about the angle, and based on the remote control device being determined to have received the identification information while oriented toward the external device, registering the identified external device as an operable external device, wherein the remote control method further comprises:
identifying a direction of respective external devices about the remote control device based on communication angles with the external devices, and displaying a map UI indicating location information of the external devices based on the direction of the respective external devices about the remote control device, the map UI comprising an indicator indicating that the remote control device is oriented toward a first external device by overlapping with the map UI, and based on the first external device being disconnected from the remote control device and a second external device being newly connected to the remote control device according to the remote control device being moved while the first external device is connected to the remote control device, removing a first UI corresponding to the first external device from the map UI and displaying a second UI corresponding to the second external device on the map UI.

12. The method of claim 11, wherein the displaying comprises, based on the remote control device being determined to be changed from a first state of being oriented toward a pre-registered first external device to a second state of being oriented toward a pre-registered second external device based on the information about the angle, displaying a first screen including a third UI for controlling the pre-registered second external device.

13. The method of claim 11, further comprising;
based on the orientation state being changed, providing a preset feedback effect,
wherein the preset feedback effect includes at least one of an effect to flick a light emitter provided in the remote control device, an effect to output a preset audio, or an effect to provide a preset vibration.

14. The method of claim 12, wherein the displaying comprises, based on the remote control device being changed from the first state of being oriented toward the pre-registered first external device to the second state of being oriented toward the pre-registered second external device, sequentially displaying a second screen including a fourth UI for controlling the first external device, a third screen including the fourth UI and a fifth UI for controlling the second external device, and a fourth screen including the fifth UI.

* * * * *